(12) United States Patent
Labrou et al.

(10) Patent No.: US 10,075,467 B2
(45) Date of Patent: Sep. 11, 2018

(54) SYSTEMS, DEVICES, AND METHODS FOR IMPROVED NETWORK SECURITY

(71) Applicant: VERISIGN, INC., Reston, VA (US)

(72) Inventors: Yannis Labrou, Washington, DC (US); Suresh Bhogavilli, Gaithersburg, MD (US); Mark Teodoro, Seattle, WA (US); Han Zhang, Fort Collins, CO (US)

(73) Assignee: VERISIGN, INC., Reston, VA (US)

( * ) Notice: Subject to any disclaimer, the term of this patent is extended or adjusted under 35 U.S.C. 154(b) by 94 days.

(21) Appl. No.: 14/952,071

(22) Filed: Nov. 25, 2015

(65) Prior Publication Data

US 2016/0149949 A1    May 26, 2016

Related U.S. Application Data (60) Provisional application No. 62/084,968, filed on Nov. 26, 2014.

(51) Int. Cl.
| | |
|---|---|
| *G06F 17/18* | (2006.01) |
| *G06F 21/55* | (2013.01) |
| *H04L 29/06* | (2006.01) |
| *H04L 12/851* | (2013.01) |

(52) U.S. Cl.
CPC ...... *H04L 63/1458* (2013.01); *H04L 47/2441* (2013.01); *H04L 63/0236* (2013.01); *H04L 63/1425* (2013.01); *H04L 2463/141* (2013.01)

(58) Field of Classification Search
CPC ...... G06F 17/18; G06F 21/55; G06F 2201/86; H04L 44/14; H04L 43/04; H04L 43/16; H04L 43/062; H04L 43/065; H04L 47/22; H04L 47/24; H04L 63/14

USPC .............. 709/201, 223–225; 726/1–3, 26, 27
See application file for complete search history.

(56) References Cited

U.S. PATENT DOCUMENTS

| | | | | |
|---|---|---|---|---|
| 2005/0249214 | A1* | 11/2005 | Peng | H04L 63/1458 709/224 |
| 2006/0242703 | A1* | 10/2006 | Abeni | H04L 63/1408 726/23 |
| 2012/0079592 | A1 | 3/2012 | Pandrangi | |
| 2014/0143825 | A1* | 5/2014 | Behrendt | G06F 21/552 726/1 |

FOREIGN PATENT DOCUMENTS

EP    2109282 A1    10/2009

OTHER PUBLICATIONS

Extended European Search Report dated May 3, 2016, European Application No. 15196435.0, pp. 1-8.

* cited by examiner

*Primary Examiner* — Joseph P Hirl
*Assistant Examiner* — Kalish Bell
(74) *Attorney, Agent, or Firm* — Artegis Law Group, LLP (57) ABSTRACT

Embodiments relate to systems, devices, and computing-implemented methods for providing DoS mitigation using a list of persistent clients generated using network flow data. Daily flow counts can be incremented once per date for unique flow combinations in the network flow data that are associated with at least one network interaction that occurred on that date. A candidate list of persistent clients can be created based on the daily flow counts, and the candidate list of persistent clients can be filtered and ranked, and the list of persistent clients can be selected based on the rankings.

20 Claims, 4 Drawing Sheets

SYSTEMS, DEVICES, AND METHODS FOR IMPROVED NETWORK SECURITY

CROSS-REFERENCE TO RELATED APPLICATIONS

This application claims priority to U.S. Provisional Patent Application having Ser. No. 62/084,968, which was filed on Nov. 26, 2014, and is incorporated herein by reference in its entirety.

BACKGROUND

When a customer of a Denial of Service or Distributed Denial of Service (hereinafter "DoS" referring to either or both) protection provider is under attack, the DoS protection provider can attempt to mitigate the attack. During the mitigation, the provider may seek to filter and/or verify the legitimacy of the incoming traffic to the customer.

However, the mitigation process may cause legitimate users to experience delays and/or require legitimate users to perform extra verification steps. Additionally, the mitigation process can require large processing and memory resources, thus affecting the ability of the provider to mitigate the attack and causing legitimate users further delay.

Therefore there is a need for systems and methods for more efficient mitigation techniques.

SUMMARY

The present disclosure relates to systems, devices, and methods for providing Denial of Service or Distributed Denial of Service (DoS) mitigation.

In an embodiment, network flow data can be used to create a daily flow count for each unique flow combination in the network flow data. A unique flow combination can be associated with flow information that includes a source internet protocol (IP) address and can represent the network flows in the network flow data that are associated with the flow information. The daily flow count can be incremented once per date for each unique flow combination based on at least one network flow: including the flow information associated with the unique flow combination; and being associated with a network interaction that occurred on the date. A candidate list of persistent clients can be generated by adding, to the candidate list of persistent clients, source IP addresses that are associated with unique flow combinations that have daily flow counts that meet a threshold. The candidate list of persistent clients can be filtered based on a filtering criteria to generate a filtered candidate list of persistent clients. The filtered candidate list of persistent clients can be ranked using a ranking metric, and a list of persistent clients can be determined based on the ranking.

In an embodiment, DoS mitigation can be performed by receiving network traffic and allowing the network traffic without performing further mitigation based on the network traffic being associated with an IP address in the list of persistent clients.

In an embodiment, traffic from an IP address associated with the list of persistent clients can be provided privileged network access that includes at least one of exclusion from DoS mitigation or higher priority network access.

In an embodiment, the flow information can include a network protocol.

In an embodiment, the flow information can include an autonomous system.

In an embodiment, the network flows can include network flows from a plurality of customers of a DoS mitigation service.

In an embodiment, determining the list of persistent clients can include selecting a fixed number of persistent clients from the ranking of the filtered candidate list of persistent clients.

In an embodiment, determining the list of persistent clients can include selecting persistent clients from the ranking of the filtered candidate list of persistent clients that are associated with Autonomous Systems that account for a predetermined percentage of network flows in the network flow data.

In an embodiment, the filtering criteria can exclude persistent clients that are associated with at least one of: an Autonomous System that meets a ranking criteria; a determined type of Autonomous System; a determined application; and a determined protocol.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

A customer of a DoS protection provider may regularly communicate with a large amount of devices outside the customer's network. Certain outside devices may connect to the customer's network every day and/or multiple times per day for legitimate reasons (e.g., visit the customer's website), while other outside devices may connect to the network once for a legitimate reason and may not return.

Devices that connect to the customer's network frequently for legitimate reasons (hereinafter, "persistent clients") can potentially be very important to the customer. In various embodiments, connections can be considered frequent if they occur a certain number of times within a time period, for example, multiple times a day, every day, multiple times a week, etc. Persistent clients can include any entity that desires to frequently make connections, such as, for example, important clients or customers, service providers, important websites, etc., and unobstructed access to the customer's network for these persistent clients can be very important to the customer. However, network delays caused by DoS mitigation services may hamper the ability of the persistent clients to connect to the customer's network, obtain the information needed, and/or perform necessary services. Accordingly, identification and/or categorization of persistent clients can greatly improve the DoS mitigation process by allowing the customer's network to deliver fast and reliable network connections even during the DoS mitigation process.

Figure 1:
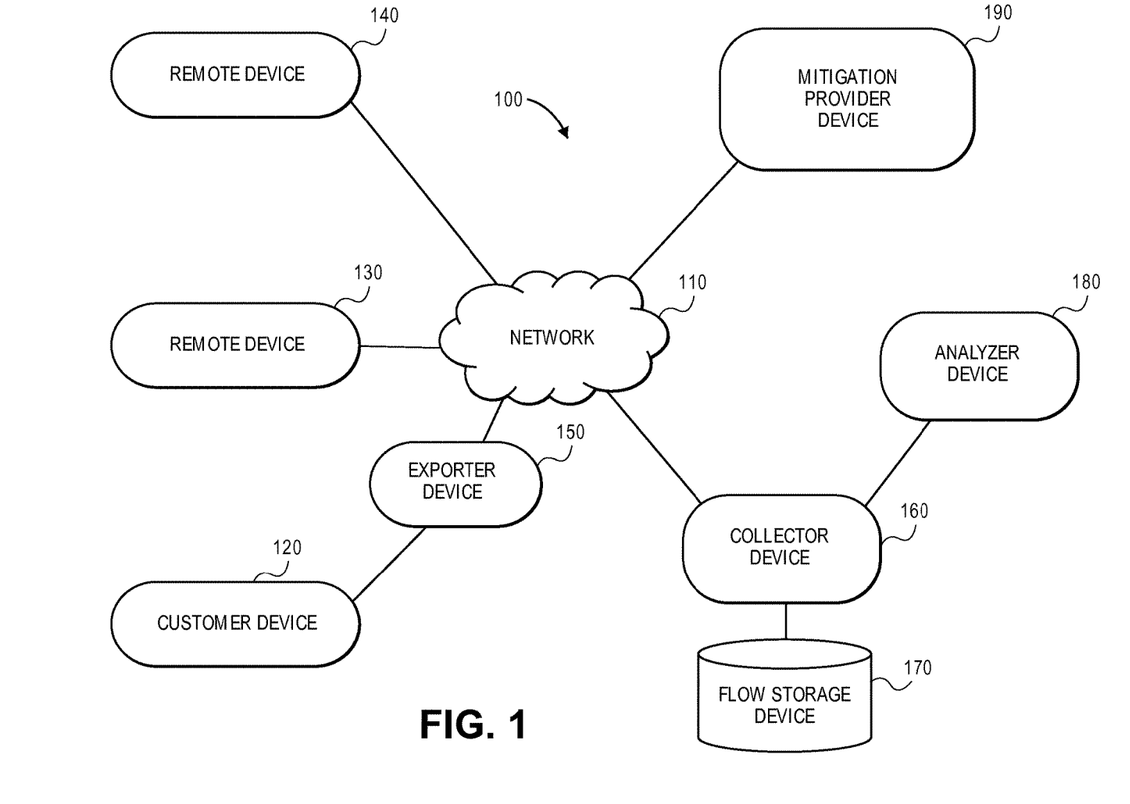
FIG. 1 is a diagram illustrating an example DoS mitigation system, consistent with certain disclosed embodiments.

FIG. 1 is a diagram illustrating an example DoS mitigation system, consistent with certain disclosed embodiments. In some embodiments, DoS mitigation system 100 can include network 110, customer device 120, remote device 130, remote device 140, exporter device 150, collector device 160, flow storage device 170, analyzer device 180, and mitigation provider device 190.

In some embodiments, network 110 can represent any type of one or more wired and/or wireless telecommunications networks. For example, network 110 can represent the Internet and/or one or more telephone networks, one or more cellular networks, one or more local area networks (LAN), etc.

In further embodiments, customer device 120 can represent one or more computing devices. For example, customer device 120 can represent a database server, a web server, a mainframe computer, etc. Additionally or alternatively, customer device 120 can represent an end user computing device such as, for example, a desktop computer, a laptop, a tablet device, a mobile device (e.g., a smartphone), etc. In various embodiments, customer device 120 can represent a computing device of an entity seeking DoS mitigation services.

In some implementations, remote device 130 and remote device 140 can each represent one or more computing devices. For example, remote device 130 and/or remote device 140 can represent a database server, a web server, a mainframe computer, etc. Additionally or alternatively, remote device 130 and/or remote device 140 can represent an end user computing device such as, for example, a desktop computer, a laptop, a tablet device, a mobile device (e.g., a smartphone), etc. In various embodiments, remote device 130 and remote device 140 represent devices that communicate with and/or connect to customer device 120 via network 110.

In some embodiments, remote device 130 and/or remote device 140 can communicate with and/or connect to customer device 120 for legitimate reasons. For example, remote device 130 and/or remote device 140 can access a website hosted on customer device 120. In further embodiments, remote device 130 and/or remote device 140 can be persistent clients and communicate with and/or connect to customer device 120 frequently for legitimate reasons. In other embodiments, remote device 130 and/or remote device 140 can be malicious clients and may communicate with and/or connect to customer device 120 for the purpose of a DoS attack.

In some embodiments, exporter device 150 can represent one or more computing devices. For example, exporter device 150 can represent a router, a database server, a web server, a mainframe computer, a desktop computer, a laptop, a tablet device, a mobile device, etc. In various embodiments, exporter device 150 represents a device that receives and/or monitors packets sent to and/or from customer device 120. In some embodiments, exporter device 150 can be on the same local area network as customer device 120. In other embodiments, exporter device 150 can be remote to customer device 120 and can monitor customer device 120 via network 110. In some implementations, customer device 120 can send all outgoing network traffic through exporter device 150 and receive all incoming network traffic from exporter device 150. In other words, exporter device 150 can receive outgoing network traffic from customer device 120, forward the outgoing network traffic to network 110, receive incoming network traffic via network 110, and forward the incoming network traffic to customer device 120. In some embodiments, exporter device 150 can aggregate received and/or monitored network packets into network flow data and export the network flow data to a collector (e.g., collector device 160).

In various embodiments, a network flow can be a data structure that represents a unidirectional sequence of packets that share certain values. For example, the shared values can be an ingress interface, a source Internet Protocol (IP) address, a destination IP address, a protocol, a source port, a destination port, and/or a type of service. Network flow data can represent a collection of multiple network flows. In various embodiments, network flow data can be exported from, for example, exporter devices (e.g., exporter device 150), web server logs, application logs, etc.

In some embodiments, the shared values can also include an autonomous system (AS) source. As used herein, an autonomous system is a collection of connected IP routing prefixes under the control of one or more network operators that presents a common, clearly defined routing policy to the internet. For example, an autonomous system can be a system controlled by a single internet service provider and/or a single corporation. In various embodiments, an autonomous system source can represent an identified autonomous system of the source IP address over a period of the most recent N days (e.g., N=21, N=90, etc.) prior to a current date.

In further embodiments, the shared values can also include a date. As used herein, a date can refer to a calendar date, as in the described examples. However, reference to a date is not limited to a calendar date, and a date can represent any unit of time, such as multiple calendar dates (e.g., weeks or months), portions of a calendar date (e.g., hours or minutes), etc.

In some implementations, collector device 160 can represent one or more computing devices. For example, collector device 160 can represent a database server, a web server, a mainframe computer, a desktop computer, a laptop, a tablet device, a mobile device, etc. In various embodiments, collector device 160 represents a device that receives network flow data sent by an exporter (e.g., exporter device 150). In some embodiments, collector device 160 can be on the same local area network as customer device 120 and/or exporter device 150. In other embodiments, collector device 160 can be remote to customer device 120 and/or exporter device 150. In additional or alternative embodiments, collector device 160 can be associated with one or more customer devices. In other words, collector device 160 can collect network flow data for one or more devices. In some embodiments, collector device 160 can store and/or preprocess the network flow data (e.g., format the network flow data for analysis). In some implementations, collector 160 can store the network flow data in a flow storage device (e.g., flow storage device 170).

In some embodiments, flow storage device 170 can represent one or more computing devices. In further embodiments, flow storage device 170 can be part of collector device 160, while, in other embodiments, flow storage device 170 can be a separate device. In some implementations, flow storage device 170 can represent a database server, a web server, a mainframe computer, a desktop computer, a laptop, a tablet device, a mobile device, etc. In additional or alternative embodiments, flow storage device 170 can be associated with one or more customer devices. In other words, flow storage device 170 can store network flow data for one or more customer devices.

In some implementations, analyzer device 180 can represent one or more computing devices. For example, analyzer device 180 can represent a database server, a web server, a mainframe computer, a desktop computer, a laptop, a tablet device, a mobile device, etc. In various embodiments, analyzer device 180 represents a device that retrieves network flow data from exporter device 150 and/or flow storage device 170 (e.g., preprocessed flow data). In some embodiments, analyzer device 180 can retrieve network flow data for a specified customer device (e.g., customer device 120), while, in other embodiments, analyzer device 180 can retrieve network flow data for multiple devices. In further embodiments, analyzer device 180 can retrieve samples of network flow data (e.g., for a specific customer device) based on a specific sampling rate. For example, analyzer device 180 can retrieve a sample of network flow data for customer device 120 with a specified sampling rate of 256. As used herein, a sampling rate can refer to the number of network flows from which a single network flow is retrieved. In other words, analyzer device 180 will retrieve one out of every 256 network flows for customer device 120 (e.g., a random selection of one network flow out of every 256, a selection of every first network flow in a sequence of 256 network flows, etc.). In various embodiments, samples may be used instead of complete data sets due to the extra processing required for each piece of network flow data and the potentially large number of simultaneous network flows stored for certain customer devices.

In some implementations, analyzer device 180 can perform the process described in FIG. 2 to analyze sampled network flow data and create a list of persistent clients for DoS mitigation, as described in further detail below.

In some embodiments, mitigation provider device 190 can represent one or more computing devices. For example, mitigation provider device 190 can represent a database server, a web server, a mainframe computer, a desktop computer, a laptop, a tablet device, a mobile device, etc. In various embodiments, mitigation provider device 190 represents a device that provides DoS mitigation services to one or more customer devices (e.g., customer device 120). In some embodiments, mitigation provider device 190 can obtain the list of persistent clients created by analyzer device 180 and use the list of persistent clients for DoS mitigation services.

Figure 3:
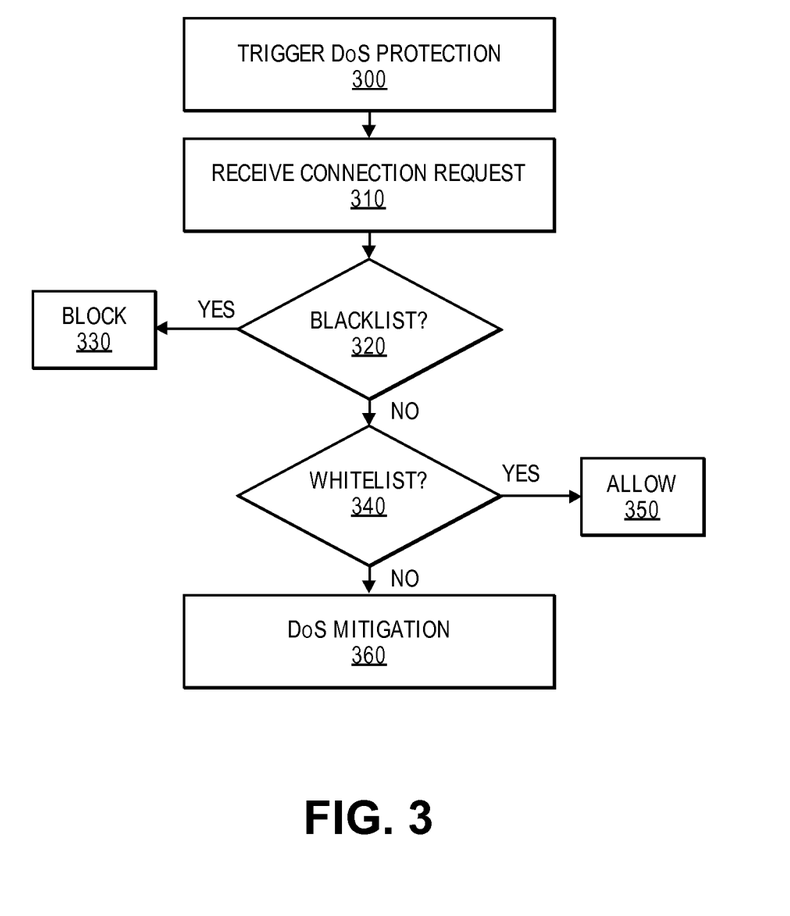
FIG. 3 is a flow diagram illustrating an example DoS mitigation process, consistent with certain disclosed embodiments.

In some embodiments, mitigation provider device 190 can perform the process described in FIG. 3 to provide DoS mitigation to a customer device (e.g., customer device 120) using a whitelist (e.g., a whitelist based on the list of persistent clients). For example, after DoS mitigation is triggered, mitigation provider device 190 can receive all traffic intended for customer device 120 and determine whether to allow the traffic (i.e., forward the traffic to customer device 120), block the traffic, or perform some other mitigation technique to ensure that the traffic is legitimate before forwarding the traffic to customer device 120.

The schematic depicted in FIG. 1 is merely for the purpose of illustration and is not intended to be limiting. Further, the DoS mitigation system depicted is merely a simplified example of a DoS mitigation system, consistent with certain disclosed embodiments, but such an example is not intended to be limiting. For example, in various embodiments, the DoS mitigation system can include additional customer devices, remote devices, exporter devices, collector devices, flow storage devices, analyzer devices, mitigation provider devices, and/or other devices. Additionally, the described devices can be separate devices, as pictured, or various devices can be combined, consistent with certain disclosed embodiments.

Figure 2:
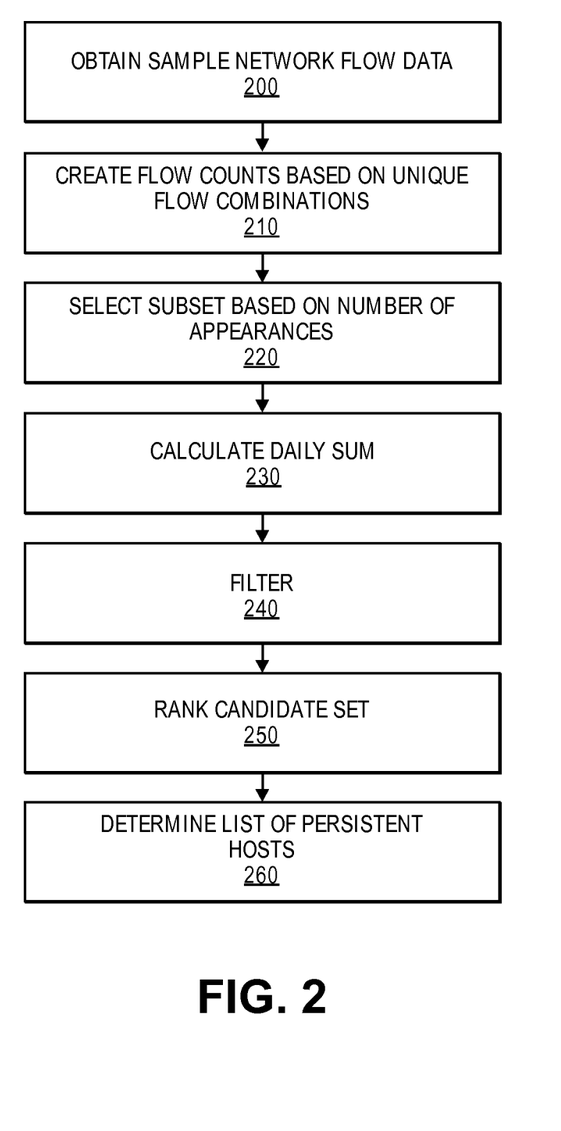
FIG. 2 is a flow diagram illustrating an example process to create a list of persistent clients, consistent with certain disclosed embodiments.

FIG. 2 is a flow diagram illustrating an example process to create a list of persistent clients, consistent with certain disclosed embodiments. In some embodiments, the method described in FIG. 2 can be performed using an end user computing device such as, for example, a desktop computer, a laptop, a tablet device, a mobile device (e.g., a smartphone), etc. In other embodiments, the method described in FIG. 2 can be performed using a computing device such as, for example, a database server (e.g., a domain name registry), a web server, a mainframe computer, a DoS mitigation server, etc. For example, the method described in FIG. 2 can be performed by analyzer device 180 in FIG. 1.

In some embodiments, the computing device can perform the process of FIG. 2 at set intervals for each customer device. For example, the computing device can perform the process once a day or once a week to ensure that the list of persistent clients remains accurate.

The process can begin in 200, when the computing device obtains network flow data. In some embodiments, the computing device can obtain samples of network flow data (e.g., for a specific customer device) based on a specific sampling rate. For example, the computing device can request (e.g., from collector device 160) a sample of network flow data for a customer device with a specified sampling rate of 256. In other words, the computing device will receive one out of every 256 network flows for the customer device (e.g., customer device 120). Additionally, for example, the computing device can request the sample of network flow data over a period of the most recent N days (e.g., N=7, N=21, N=90, etc.) prior to a current date.

In 210, the computing device can create daily flow counts based on unique flow combinations. For example, each flow can include information such as a date, a source IP address, an autonomous system (AS) source, a protocol (e.g., Internet Control Message Protocol (ICMP), Transmission Control Protocol (TCP), Domain Name System (DNS), etc.), and/or a customer identifier (i.e., a unique number or alphanumeric text that identifies a customer of a DoS protection provider (e.g., customer device 120)). Accordingly, the computing device can increment a daily flow count of each unique flow combination each date if the unique flow combination occurs at least once that date.

As an example of incrementing daily flow counts for each unique flow combination, on the first detected occurrence of a network flow that occurred on 10/12/15 with a source IP of 192.0.2.0, an AS source of Example Corp., a protocol of TCP, and a customer identifier of 110, the daily flow count for that unique flow combination can be incremented to one. On the detected occurrence of a second network flow with the same information (a source IP of 192.0.2.0, an AS source of Example Corp., a protocol of TCP, and a customer identifier of 110) on the same date, the daily flow count for that unique flow combination remains at one. On the detected occurrence of a third network flow with the same information (a source IP of 192.0.2.0, an AS source of Example Corp., a protocol of TCP, and a customer identifier of 110) on 10/13/15, the daily flow count for that unique flow combination can be incremented to two.

In further embodiments, network flows can include information such as the daily flow count of the network flow, a sampling interval number, port numbers, etc.

In 220, the computing device can select a subset of the daily flow counts, such that the subset includes unique flow combinations that have a daily flow count of at least Y days. In some embodiments, Y can be selected such that the source IP addresses associated with the subset of daily flow counts have a persistent and consistent interaction with a customer device (e.g., using the same protocol). For example, Y can be selected such that $$\frac{N-Y}{N} = .9, \frac{N-Y}{N} = .95, \text{ or } \frac{N-Y}{N} = 1.$$

In some embodiments, multiple subsets of the daily flow counts can be selected. For example, for a first, whitelist subset, Y can be selected such that $$\frac{N-Y}{N} = .9$$

and, for a second, greylist subset, Y can be selected such that $$\frac{N-Y}{N} = .5.$$

The two subsets can be filtered and ranked, as discussed for a single subset below, and two lists of persistent hosts can be determined in 260, with the first list used as a whitelist and the second list used as a greylist.

In various embodiments, the source IP addresses of the subset of daily flow counts selected in 220 can be considered a candidate set of persistent client IP addresses. In further embodiments, the source IP address and protocol pairs of the subset of flow counts selected in 220 can be considered a candidate set of persistent client IP addresses. A source IP address and protocol pair can refer to a unique flow combination that includes a unique pair of a source IP address and a protocol. In other words, a source IP address and a first protocol (e.g., TCP) pair represents a first unique flow combination, and the same source IP address and a second protocol (e.g., ICMP) pair can be a second unique flow combination. Additionally, both pairs can represent separate entries in the candidate set of persistent client IP addresses.

In 230, the computing device can calculate a sum of the daily flow counts. For example, the sum of daily flow counts can be a sum of all the daily flow counts created and incremented in 210.

In some embodiments, the computing device can additionally determine one or more statistical measures of the daily flow count for a unique flow combination in relation to the sum of daily flow counts and/or each other daily flow count, such as average, median, multiple percentile values, mode, standard deviation, variance, etc.

In 240, the computing device can filter the candidate set of persistent client IP addresses using one or more filters.

In some embodiments, the computing device can filter the candidate set based on membership. For example, the computing device can map the persistent client IP addresses in the candidate set to the level of an autonomous system, aggregate flow counts per autonomous system, rank each autonomous system based on the aggregated flow counts, and select autonomous systems that collectively account for a high ratio of flows in the network flow data (e.g., 90% of the flows) and exclude IP addresses from the candidate set that do not belong to the selected autonomous system(s). In some embodiments, the aggregation of counts per autonomous system is an aggregation of the counts of all source IPs from the same autonomous system. The count of a source IP is a function of the number of days, the sampling ratio, and, in some embodiments, at least one of the statistical measures determined in 230. For example, the count can be a product of the number of days, the sampling ratio, and an average.

In further embodiments, the computing device can filter the candidate set of persistent client IP addresses based on type. In some embodiments, the computing device can identify the type of autonomous system that the source IP address belongs to and exclude the source IP addresses that belong to an autonomous system of a certain known type. For example, source IP addresses that belong to a known consumer-oriented ISP can be excluded. Other examples of autonomous system types include, but are not limited to, financial institutions, academic institutions, telecommunication companies, non-profit organizations, etc.

In other embodiments, the computing device can filter the candidate set of persistent client IP addresses based on application. For example, the computing device can define a set of applications that are commonly used by attackers. In some embodiments, the set of applications can be associated with port numbers frequently used by the applications and the port numbers can be used to identify applications associated with network flow data. For example, the computing device can identify the network flows for each application based on a port number and the total number of flows sent from the same IP address to the customer device. If the ratio of these two numbers is greater than a threshold, the source IP can be excluded from the candidate set. In some embodiments, the threshold can be set close to one (e.g., 0.95).

In further embodiments, the computing device can filter the candidate set of persistent client IP addresses based on protocol. For example, the computing device can calculate the number of network flows that indicate a certain protocol was used (e.g., ICMP) and the total number of network flows sent from the same source IP address to the customer device. If the ratio of these two numbers is above a threshold, the source IP can be removed from the candidate set. In some embodiments, the threshold can be set close to one (e.g., 0.95).

In 250, the computing device can rank the remaining persistent client IP addresses in the candidate set. In some embodiments, the computing device can use a ranking metric and select either a fixed number of IP addresses or select IP addresses that collectively account for a high ratio (e.g., 90%) of network flows in the network flow data or in the candidate set. In some implementations, the ranking metric can be a function of the number of days, the sampling ratio, and at least one of the statistical measures determined in 230. For example, the ranking metric can be a product of the number of days, the sampling ratio, and an average and/or the sum of the daily flow counts. IP addresses that are not selected based on the ranking metric can be excluded from the candidate set.

In 260, the computing device can determine the list of persistent clients. In some embodiments, the list of persistent clients can include the IP addresses remaining in the candidate set of persistent client IP addresses. In further embodiments, the list of persistent clients can be annotated with the source IP address, the protocol, the autonomous system they belong to, the sampling interval, the value of the ranking metric, and the rank of the source IP address.

In some embodiments, the list of persistent clients can be submitted to a customer and the customer can validate the list of persistent clients before proceeding. In other embodiments, the list of persistent clients can be used as a whitelist, as described below.

While the steps depicted in FIG. 2 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Additionally, FIG. 2 merely represents an example of determining persistent clients, and other methods can be used, consistent with certain disclosed embodiments. For example, the computing device can identify the unique flow combinations, identify unique flow combinations that occur on at least D days out of the total N days as candidate persistent clients, and filter the candidate persistent clients based on one or more of the filters described in 240 above.

Further, although the above methods describe identifying persistent clients of a single customer, in some embodiments, the computing device can determine a global list of persistent clients. For example, the global list of persistent clients can include websites, service providers, etc. that frequently communicate with multiple customers. In various embodiments, the computing device can determine the global list of persistent clients by identifying the unique flow combinations, identifying unique flow combinations that occur on at least D days out of the total N days as candidate global persistent clients, identifying unique flow combinations that communicate with at least M customers for at least D days as candidate global persistent clients (i.e., excluding unique flow combinations not identified), and filtering the candidate global persistent clients based on one or more of the filters described in 240 above to create the global list of persistent clients. In some embodiments, the list of persistent clients for a customer described herein can additionally include the global list of persistent clients.

In some embodiments, the list of persistent clients can be used to provide privileged network access to customer device. For example, during periods of heavy traffic, traffic from persistent clients can be given higher priority to ensure traffic from critical services and loyal clients are not affected. In other embodiments, the list of persistent clients can be excluded from DoS mitigation. For example, the list of persistent clients can be used to as a whitelist in DoS mitigation, as described below.

FIG. 3 is a flow diagram illustrating an example DoS mitigation process, consistent with certain disclosed embodiments. In some embodiments, the method described in FIG. 3 can be performed using an end user computing device such as, for example, a desktop computer, a laptop, a tablet device, a mobile device (e.g., a smartphone), etc. In other embodiments, the method described in FIG. 3 can be performed using a computing device such as, for example, a database server (e.g., a domain name registry), a web server, a mainframe computer, etc. For example, the method described in FIG. 3 can be performed by mitigation provider 190 in FIG. 1.

The process can begin in 300, when the computing device triggers DoS protection for one or more customer devices (e.g., customer device 120 in FIG. 1). In some embodiments, the DoS protection can be triggered based on a request from a customer device. In further embodiments, the DoS protection can be triggered based on determining that a customer device is under or may be under a DoS attack. In still further embodiments, determining that a customer device is under or may be under a DoS attached can be based on analyzing network traffic that is not associated with a persistent client (e.g., not in the list of persistent clients determined in FIG. 2).

In some implementations, the computing device can provide DoS mitigation services by receiving all connection requests intended for the customer device, forwarding legitimate requests to the customer device, and blocking illegitimate requests.

In 310, the computing device can receive a connection request (e.g., from remote device 130 in FIG. 1) intended for a customer device under DoS protection (e.g. customer device 120 in FIG. 1).

In 320, the computing device can determine whether to block the connection request based on a blacklist. For example, if an IP address associated with the source of the connection request and/or a protocol associated with the connection request are on the blacklist, the computing device can proceed 330 and block the connection request (i.e., do not forward the connection request to the customer device). If the connection request does not correspond to information in the blacklist, the computing device can proceed to 340. In various embodiments, the computing device can store information in a log regarding the connection request and whether the connection request was blocked.

In various embodiments, the blacklist can be generated based on, for example, user input, automatic determination of malicious devices, automatic determination of suspicious devices, list of devices known to have performed attacks in the past, etc.

In 340, the computing device can determine whether to allow the connection request based on a whitelist. In some embodiments, the computing device can use the list of persistent clients determined in FIG. 2 as the whitelist. For example, the computing device can receive the whitelist and/or receive a list of persistent clients from a network flow analyzer (e.g., analyzer 180 in FIG. 1) and use the list of persistent clients as the whitelist. In some embodiments, if, for example, an IP address associated with the source of the connection request and/or a protocol associated with the connection are on the whitelist, the computing device can proceed 350 and allow the connection request without preforming further mitigation processes (i.e., forward the connection request to the customer device). Accordingly, the computing device does not have to further process the connection request, saving processing resources, processing time, and storage of the computing device, and the originator of the legitimate connection request only experiences minimal network delays due to the DoS protection.

If the connection request does not correspond to information in the whitelist, the computing device can proceed to 360. In various embodiments, the computing device can store information in a log regarding the connection request and whether the connection request was allowed.

In 360, the computing device can perform DoS mitigation processes on connection requests that do not correspond to information in the blacklist or the whitelist. For example, the computing device can use DoS mitigation processes such as, but not limited to, SYNPROXY, Rate Limiting, Aggressive Aging, etc. In various embodiments, legitimate connection requests can be forwarded to the customer device after the DoS mitigation processes, however, the originators of the legitimate connection request may experience network delays due to the mitigation processes.

While the steps depicted in FIG. 3 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed. For example, in some embodiments, the computing device can determine whether to perform a subset of DoS mitigation processes based on a greylist. In some embodiments, the computing device can use a second list of persistent clients determined in FIG. 2 as the greylist. For example, the computing device can receive both the whitelist and the greylist from a network flow analyzer (e.g., analyzer 180 in FIG. 1). In such embodiments, the subset of DoS mitigation processes performed on connection requests that correspond to information in the greylist may not include web application firewall (WAF) filters because WAF filters can be computationally expensive.

Figure 4:
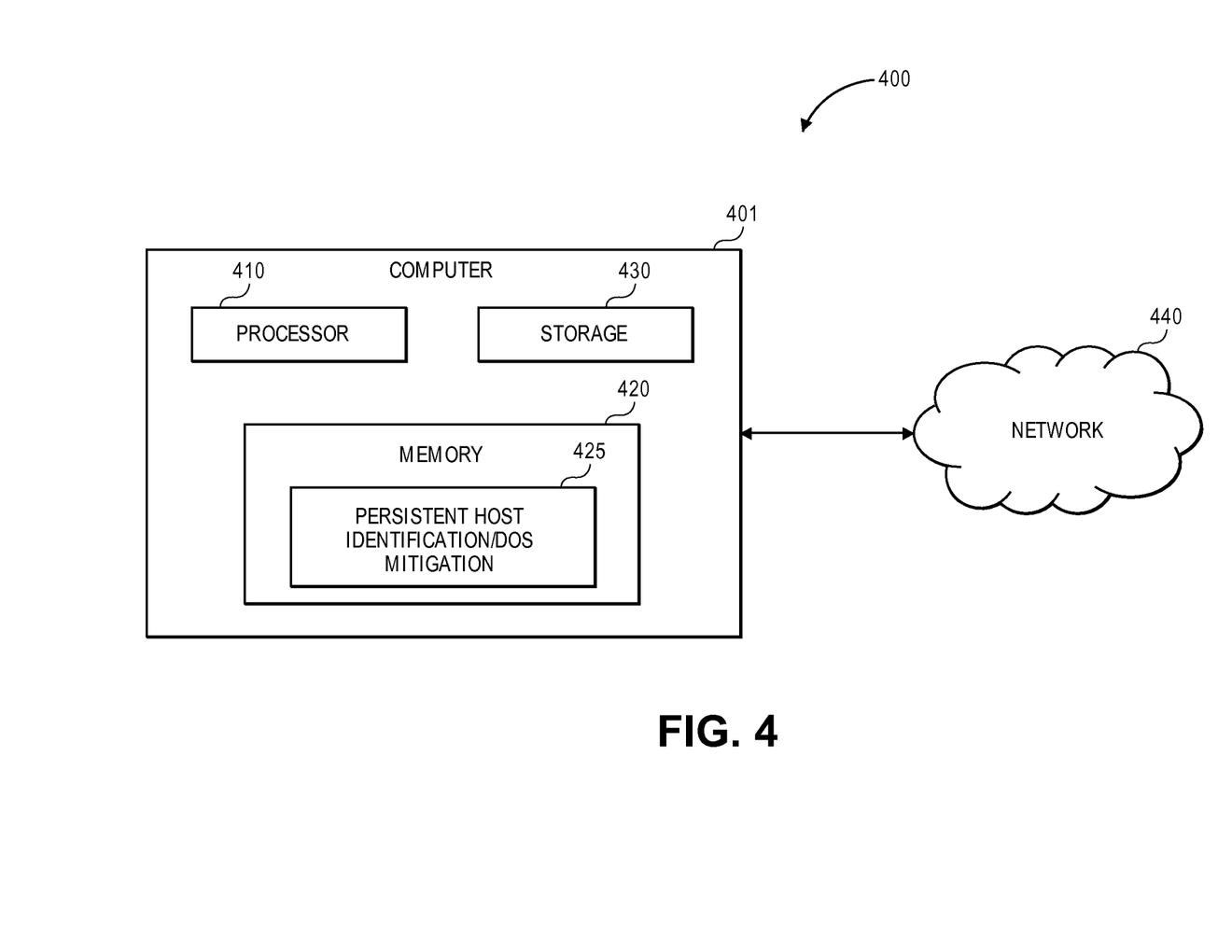
FIG. 4 is a diagram illustrating an example of a hardware system for persistent client identification and improved DoS mitigation, consistent with certain disclosed embodiments.

FIG. 4 is a diagram illustrating an example of a hardware system for persistent client identification and improved DoS mitigation, consistent with certain disclosed embodiments. An example hardware system 400 includes example system components that may be used. The components and arrangement, however, may be varied.

Computer 401 may include processor 410, memory 420, storage 430, and input/output (I/O) devices (not pictured). The computer 401 may be implemented in various ways and can be configured to perform any of the embodiments described above. In some embodiments, computer 401 can be a general purpose computer of an end user such as, for example, a desktop computer, a laptop, a tablet device, a mobile device (e.g., a smartphone), etc. In other embodiments, computer 401 can be a computing device such as, for example, a data base server (e.g., a domain name registry), a web server, a mainframe computer, etc. For example, computer 401 can be analyzer device 180 and/or mitigation provider device 190 in FIG. 1. Computer 401 may be standalone or may be part of a subsystem, which may, in turn, be part of a larger system.

The processor 410 may include one or more known processing devices, such as a microprocessor from the Intel Core™ family manufactured by Intel™, the Phenom™ family manufactured by AMD™, or the like. Memory 420 may include one or more storage devices configured to store information and/or instructions used by processor 410 to perform certain functions and operations related to the disclosed embodiments. Storage 430 may include a volatile or non-volatile, magnetic, semiconductor, tape, optical, removable, non-removable, or other type of computer-readable medium used as a storage device. In some embodiments, storage 430 can include, for example, lists of persistent clients (e.g., lists of persistent clients for individual customers and/or a global list of persistent clients), whitelists for DoS mitigation, blacklists for DoS mitigation, etc.

In an embodiment, memory 420 may include one or more programs or subprograms including instructions that may be loaded from storage 430 or elsewhere that, when executed by computer 401, perform various procedures, operations, or processes consistent with disclosed embodiments. For example, memory 420 may include persistent client identification and/or DoS mitigation program 425 for determining lists of persistent clients based on network flow data and/or providing DoS mitigation services using a whitelist created based on a list of persistent clients, according to various disclosed embodiments. Memory 420 may also include other programs that perform other functions, operations, and processes, such as programs that provide communication support, Internet access, etc. The persistent client identification and/or DoS mitigation program 425 may be embodied as a single program, or alternatively, may include multiple sub-programs that, when executed, operate together to perform the function of the persistent client identification and/or DoS mitigation program 425 according to disclosed embodiments. In some embodiments, persistent client identification and/or DoS mitigation program 425 can perform all or part of the processes of FIGS. 2 and 3, described above.

Computer 401 may communicate over a link with network 440. For example, the link may be a direct communication link, a local area network (LAN), a wide area network (WAN), or other suitable connection. Network 440 may include the internet, as well as other networks, which may be connected to various systems and devices.

Computer 401 may include one or more input/output (I/O) devices (not pictured) that allow data to be received and/or transmitted by computer 401. I/O devices may also include one or more digital and/or analog communication I/O devices that allow computer 401 to communicate with other machines and devices. I/O devices may also include input devices such as a keyboard or a mouse, and may include output devices such as a display or a printer. Computer 401 may receive data from external machines and devices and output data to external machines and devices via I/O devices. The configuration and number of input and/or output devices incorporated in I/O devices may vary as appropriate for various embodiments.

Example uses of the system 400 can be described by way of example with reference to the embodiments described above.

While the teachings has been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A system comprising:
one or more processors; and
a memory that is coupled to the one or more processors and includes instructions, wherein, when the one or more processors execute the instructions, the one or more processors are configured to perform operations comprising:

obtaining network flow data comprising one or more network flows comprising network packets received from a set of source IP addresses over a network;

analyzing the network flow data based on a pre-determined format of the network flow data to generate one or more unique flow combinations, wherein each unique flow combination is associated with a different source internet protocol (IP) address and represents at least one of the one or more network flows;

creating a daily flow count of a plurality of flow counts for each unique flow combination in the network flow data;

for each unique flow combination, incrementing by one the daily flow count associated with the unique flow combination and corresponding to a given date when at least one network flow of the one or more network flows represented by the unique flow combination is associated with a network interaction that occurred on the given date;

generating a candidate list of persistent clients that includes source IP addresses associated with unique flow combinations that have daily flow counts that meet a threshold;

filtering the candidate list of persistent clients based on a filtering criteria to generate a filtered candidate list of persistent clients;

ranking the filtered candidate list of persistent clients using a ranking metric; and determining a list of persistent clients based on the ranking of the filtered candidate list of persistent clients.

2. The system of claim 1, wherein the operations further comprise:

performing Denial of Service or Distributed Denial of Service (DoS) mitigation by:
receiving network traffic; and
allowing the network traffic, without performing further mitigation, based on the network traffic being associated with a first IP address included in the list of persistent clients.

3. The system of claim 1, wherein the operations further comprise providing privileged network access to traffic from IP addresses associated with the list of persistent clients, wherein the privileged network access comprises at least one of exclusion from DoS mitigation or higher priority network access.

4. The system of claim 1, wherein a first unique flow combination is further associated with a network protocol, and wherein network packets included in a subset of the one or more network flows represented by the first unique flow combination are transmitted according to the network protocol.

5. The system of claim 1, wherein a first unique flow combination is further associated with an autonomous system, and network packets included in a subset of the one or more network flows represented by the first unique flow combination originate at the autonomous system.

6. The system of claim 1, wherein a subset of the one or more network flows represented by a first unique flow combination comprises network flows from a plurality of customers of a Denial of Service or Distributed Denial of Service (DoS) mitigation service.

7. The system of claim 1, wherein determining the list of persistent clients based on the ranking of the filtered candidate list of persistent clients comprises selecting a fixed number of persistent clients from the ranking of the filtered candidate list of persistent clients.

8. The system of claim 1, wherein determining the list of persistent clients based on the ranking of the filtered candidate list of persistent clients comprises selecting persistent clients from the ranking of the filtered candidate list of persistent clients that are associated with autonomous systems that account for a predetermined percentage of network flows in the network flow data.

9. The system of claim 1, wherein the filtering criteria excludes persistent clients that are associated with at least one of:
an Autonomous System that meets a ranking criteria;
a determined type of Autonomous System;
a determined application; and
a determined protocol.

10. A computer-implemented method, comprising:

obtaining network flow data comprising one or more network flows comprising network packets received from a set of source IP addresses over a network;

analyzing the network flow data based on a pre-determined format of the network flow data to generate one or more unique flow combinations, wherein each unique flow combination is associated with a different source internet protocol (IP) address and represents at least one of the one or more network flows:

creating a daily flow count of a plurality of flow counts for each unique flow combination in the network flow data;

for each unique flow combination, incrementing by one the daily flow count associated with the unique flow combination and corresponding to a given date when at least one network flow of the one or more network flows represented by the unique flow combination is associated with a network interaction that occurred on the given date;

generating a candidate list of persistent clients that includes source IP addresses associated with unique flow combinations that have daily flow counts that meet a threshold;

filtering the candidate list of persistent clients based on a filtering criteria to generate a filtered candidate list of persistent clients;

ranking the filtered candidate list of persistent clients using a ranking metric; and determining a list of persistent clients based on the ranking of the filtered candidate list of persistent clients.

11. The method of claim 10, further comprising:
performing Denial of Service or Distributed Denial of Service (DoS) mitigation by:
receiving network traffic; and
allowing the network traffic, without performing further mitigation, based on the network traffic being associated with a first IP address included in the list of persistent clients.

12. The method of claim 10, further comprising providing privileged network access to traffic from IP addresses associated with the list of persistent clients, wherein the privileged network access comprises at least one of exclusion from DoS mitigation or higher priority network access.

13. The method of claim 10, wherein a first unique flow combination is further associated with a network protocol, and wherein network packets included in a subset of the one or more network flows represented by the first unique flow combination are transmitted according to the network protocol.

14. The method of claim 10, wherein a first unique flow combination is further associated with an autonomous system, and network packets included in a subset of the one or more network flows represented by the first unique flow combination originate at the autonomous system.

15. The method of claim 10, wherein a subset of the one or more network flows represented by a first unique flow combination comprises network flows from a plurality of customers of a Denial of Service or Distributed Denial of Service (DoS) mitigation service.

16. The method of claim 10, wherein determining the list of persistent clients based on the ranking of the filtered candidate list of persistent clients comprises selecting a fixed number of persistent clients from the ranking of the filtered candidate list of persistent clients.

17. The method of claim 10, wherein determining the list of persistent clients based on the ranking of the filtered candidate list of persistent clients comprises selecting persistent clients from the ranking of the filtered candidate list of persistent clients that are associated with autonomous systems that account for a predetermined percentage of network flows in the network flow data.

18. The method of claim 10, wherein the filtering criteria excludes persistent clients that are associated with at least one of:
   an Autonomous System that meets a ranking criteria;
   a determined type of Autonomous System;
   a determined application; and
   a determined protocol.

19. A non-transitory computer readable storage medium comprising instructions for causing one or more processors to:
   obtain network flow data comprising one or more network flows comprising network packets received from a set of source IP addresses over a network;
   analyze the network flow data based on a pre-determined format of the network flow data to generate one or more unique flow combinations, wherein each unique flow combination is associated with a different source internet protocol (IP) address and represents at least one of the one or more network flows;
   create a daily flow count of a plurality of flow counts for each unique flow combination in the network flow data;
   for each unique flow combination, increment by one the daily flow count associated with the unique flow combination and corresponding to a given date when at least one network flow of the one or more network flows represented by the unique flow combination is associated with a network interaction that occurred on the given date;
   generate a list of persistent clients that includes source IP addresses associated with unique flow combinations that have daily flow counts that meet a threshold;
   filter the candidate list of persistent clients based on a filtering criteria to generate a filtered candidate list of persistent clients;
   rank the filtered candidate list of persistent clients using a ranking metric; and
   determine a list of persistent clients based on the ranking of the filtered candidate list of persistent clients.

20. The non-transitory computer readable storage medium of claim 19, the instructions further causing the one or more processors to:
   perform Denial of Service or Distributed Denial of Service (DoS) mitigation by:
      receiving network traffic; and
      allowing the network traffic, without performing further mitigation, based on the network traffic being associated with a first IP address in the list of persistent clients.

* * * * *